March 15, 1927.  
E. H. REHN  
ADJUSTABLE SPINDLE BOLT  
Filed May 25, 1926
1,620,688
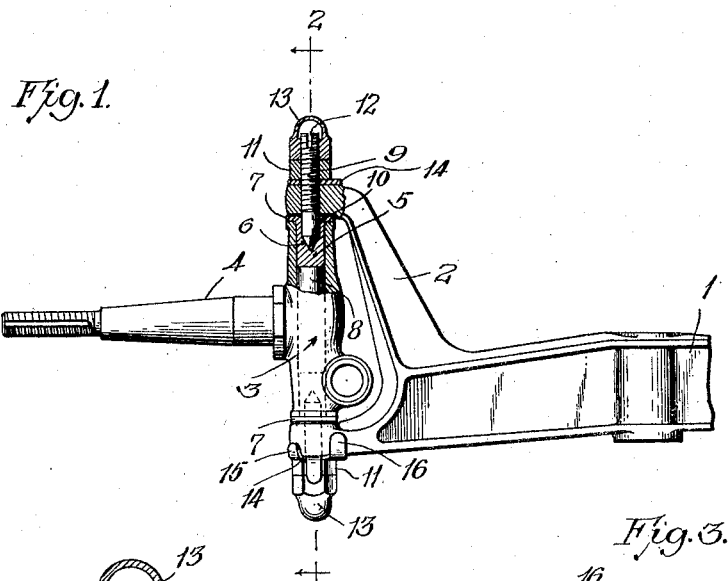
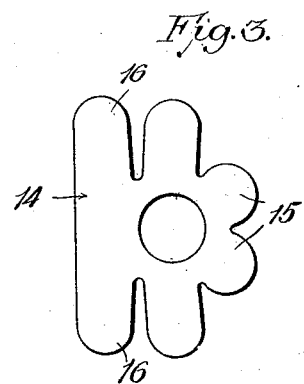
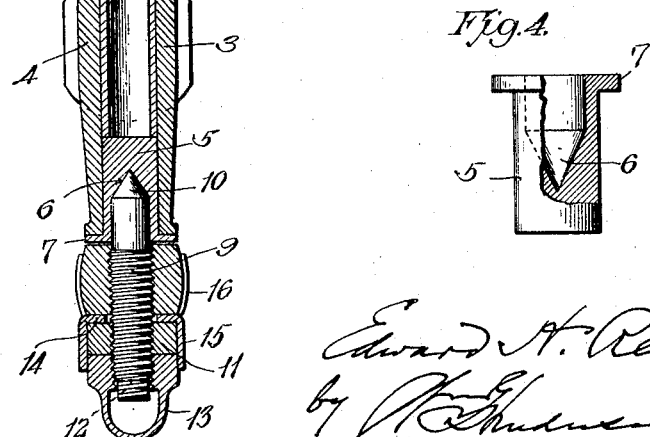
Inventor:  
Edward H. Rehn,  
by  Attorney.

Patented Mar. 15, 1927.

1,620,688

UNITED STATES PATENT OFFICE.

EDWARD H. REHN, OF LIMA, OHIO.

ADJUSTABLE SPINDLE BOLT.

Application filed May 25, 1926. Serial No. 111,572.

My invention relates to steering axles of vehicles, especially of motor vehicles, and has for its object to provide adjustable spindle-bolts that make steering of the vehicle easier and steadier, and in which the parts can easily be adjusted and tightened to take up wear and restore the parts to normal easy running condition, and in which also the life or wearing qualities of the parts are prolonged, and in which the parts may be easily and quickly installed.

To the accomplishment of the foregoing and such other objects as may hereinafter appear, the invention consists in the features and elements hereinafter particularly described and then sought to be clearly defined by the claims, reference being had to the accompanying drawing forming a part hereof, and which illustrates the preferred embodiment of the invention.

In the drawings—

Figure 1 is a side view of a portion of the front axle and its spindle, with parts in section;

Figure 2 is a vertical longitudinal section through the spindle elements;

Figure 3 is a plan view of the lock washer;

Figure 4 is a detached view, partly in section, of one of the bushings.

In the drawing the numeral 1 designates a portion of the front-axle of a motor vehicle formed with the fork-arms 2 of a common type to which is swiveled the knuckle or sleeve-body portion 3 of the steering wheel spindle 4 in a well known type of construction. Instead of connecting the sleeve-body or knuckle 3 of the spindle to the arms of the axle fork by a bolt passed through the sleeve-body and both arms of the axle fork, I place in opposite ends of the bore of the sleeve-body or knuckle 3, bushings 5 having internal tapering or conical seats 6 and external end flanges 7 which bear against the ends of the sleeve-body, the two bushings being spaced apart by a spacer tube 8, preferably made of steel, and against which the inner ends of the bushings may bear. Through the ends of the arms 2 of the axle fork are passed bolts 9, which have tapering or conical ends 10 that seat in the conical seats 6 of the bushings and are threaded throughout a portion of their length so that they may have threaded adjustment in correspondingly threaded openings in the ends of the arms 2 of the axle fork, the bolts being held to their adjustment by jam-nuts 11. If the bolts are not formed with angular heads for application of a wrench for their adjustment, they will be formed in the end with a kerf 12 for reception of a screw-driver for their adjustment, and in such case a cap-nut 13 will be screwed onto the end of the bolts. For the purpose of holding the jam-nut and also the cap-nut against loosening after the several parts have been properly adjusted, a lock-washer 14 is placed, in assembling the parts, between the jam-nut 11 and the arm of the axle fork, said washer being formed with bendable lips 15 and longer bendable lips 16, the lips 15 being bent so that some will bear against the sides of the jam-nuts 11 and cap-nuts 13 and others bear against the arms of the axle fork, while the longer lips 16 will be bent to bear against the arm 2 of the axle fork, so that the washer will be locked against movement and at the same time the bolt nuts will likewise be held against movement and thus the several assembled parts will be locked to their adjustment.

In assembling the parts, the spacer and the two end bushings are fitted in the bore of the sleeve-body 3 of the spindle, the sleeve-body is then positioned between the ends of the two arms of the axle fork, the lock-washers and the jam-nuts are then placed on the threaded bolts, the bolts are then threaded into the threaded openings in the ends of the fork arms with the unthreaded portions of the bolts fitting in the bushings and their conical ends seated in the conical cavities or seats of the bushings, the bolts are then each adjusted so as to have the space between the bushings and inner faces of the fork arms substantially the same at the two ends of the sleeve-body of the spindle, then the jam-nuts are tightened so that some little pressure is required to turn the sleeve-body, then the outermost nuts are turned tight, and then the shorter lips of the washers are bent outward against the sides of the two nuts at each end of the sleeve-body, and the longer lips bent over the arms of the axle fork, so that all the assembled parts are locked and held in their assembled relations. When the parts become worn in use and need adjustment, the lock washers are disengaged from locking position in relation to the nuts, so as to permit the threaded bolts to be manipulated to adjust the bushings to make the spaces between them and the arms of the fork substantially the same at both ends of the sleeve-body, the end having the least clearance being the end needing adjustment. When the parts are assembled in the relationship described the weight of the vehicle body is supported or carried by the tapering or conical ends of the adjusting bolts seated in the conical seats of the bushings, and any crushing strains on the bushings is resisted by the spacer tube or filler disposed between adjacent ends of the bushings. The elements specified are easy of installation without the use of high skilled labor, and may be employed to replace spindle bolts of standard type in which the bolts and bushings may be removed and a tap run through the ends of the fork-arms and sleeve-body to form a bore adapted to receive the parts as herein described.

I have described the preferred details of the various elements employed in carrying out this invention but changes may be made therein without departing from the scope of the invention as sought to be expressed in the claims.

It will be observed that by providing the bushings with internal seats for the adjusting bolts which exert their thrust on the seats, I am enabled to maintain a clearance between the flanged ends of the bushings and inner faces of the fork-arms, as clearly illustrated in the drawing, so that the thrust of the adjusting bolts and weight of the vehicle body is received and carried by the bushings, and friction between the ends of the bushings and adjacent faces of the fork-arms avoided, resulting in materially removing friction and making steering of the car much easier than otherwise would be the case. Furthermore, wear due to friction between the connecting and suspension parts is materially lessened, thus contributing to the life of the parts. This friction is further materially lessened by the cone bearing afforded by the conical ends of the adjusting bolts and conical shaped seats in the bushings. Again the spacing tube between the two bushings serves to receive some of the strain transmitted through the adjusting bolts which tends to relieve the weight and pressure transmitted through the flanges of the bushings to the ends of the knuckles and thus further reduces friction and wear between the parts, as well as contributing to easier steering of the car. While this spacing member is of advantage it is not absolutely essential to securing material advantages and results from the other features described.

This application is filed as a continuation, in part, of my application filed October 3, 1924, Serial No. 741,511.

Having described my invention and set forth its merits, what I claim is:—

1. In a vehicle, the combination with a fork-arm axle, of a wheel-spindle having a knuckle fitted between the fork-arms of the axle, bushings fitted in the opposite ends of the knuckle and each formed with a flange at one end and an internal seat to receive the thrust of an adjusting bolt, there being a clearance between the flanges of the bushings and adjacent faces of the fork-arms, and means operating to maintain said clearance and effect a pivotal support of the axle on the bushings, said means consisting of bolts having a threaded adjustment in the fork-arms and exerting pressure upon the internal seats of the bushings.

2. In a vehicle, the combination with a fork-arm axle, of a wheel-spindle having a knuckle fitted between the fork-arms of the axle, bushings fitted in the opposite ends of the knuckle, each formed with an internal conical seat to receive the thrust of an adjusting bolt, a clearance being between the flanged ends of the bushings and adjacent faces of the fork-arms, bolts threaded in the ends of the fork-arms and having conical ends to exert pressure on the internal conical seats of the bushings and capable of independent adjustment for regulating the clearance between the ends of the bushings and fork-arms, and jam-nuts fitted to the threads of the bolts.

3. In a vehicle, the combination with a fork-arm axle, of a wheel-spindle having a knuckle fitted between the fork-arms of the axle, bushings fitted in the opposite ends of the knuckle, a spacing member between the ends of the bushings, and bolts threaded in the ends of the fork-arms and having their ends seated in the bushings and capable of independent adjustment, and jam-nuts fitted to the threads of the bolts.

In testimony whereof I affix my signature.

EDWARD H. REHN.